United States Patent [19]

Zambiasi

[11] 4,146,976

[45] Apr. 3, 1979

[54] MODULAR PANEL THAT CAN BE ASSEMBLED WITH OTHER SIMILAR PANELS, WHEREBY TO FORM MAGNETIC BOARDS FOR PROGRAMMING AND STATISTICAL PURPOSES

[75] Inventor: Franco Zambiasi, Milan, Italy

[73] Assignee: Tecno-Planning Italia Di Giulini e Zambiasi, Milan, Italy

[21] Appl. No.: 733,901

[22] Filed: Oct. 19, 1976

[30] Foreign Application Priority Data

Oct. 21, 1975 [IT] Italy .............................. 28530 A/75

[51] Int. Cl.[2] ............................................ G09B 29/00

[52] U.S. Cl. .................................. 35/24 R; 35/7 A; 40/600

[58] Field of Search ............ 35/7 R, 7 A, 24 R, 24 A, 35/24 B, 31 F, 31 D, 34; 40/125 F, 142 A, 600

[56] References Cited

U.S. PATENT DOCUMENTS

| | | | |
|---|---|---|---|
| 1,163,125 | 12/1915 | Bechmann | 35/31 D |
| 2,598,498 | 5/1952 | Brown | 40/125 F X |
| 3,766,668 | 10/1973 | Vogel | 35/35 H |

FOREIGN PATENT DOCUMENTS

| | | | |
|---|---|---|---|
| 1579280 | 7/1969 | France | 35/7 A |

*Primary Examiner*—William H. Grieb
*Attorney, Agent, or Firm*—Browdy and Neimark

[57] ABSTRACT

Disclosed herein is a modular panel that can be assembled with other similar panels, to form magnetic boards for programming and statistical purposes. Each panel consists of a metal sheet, whereon a grating is defined by two pluralities of equidistantly spaced parallel grooves, grooves of one plurality being perpendicular to those of the other. The grooves are embossed on the metal sheet. The center-to-center distance of successive nodes, or points of intersection of the grooves subdivide the board into equal parts. Magnetic signalling elements can be inserted into said grooves. The same elements can be horizontally or vertically placed on the board, whatever the orientation thereof may be.

1 Claim, 5 Drawing Figures

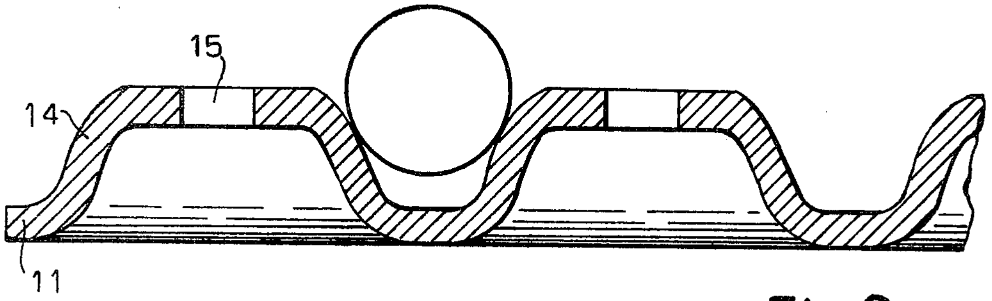
Fig.2
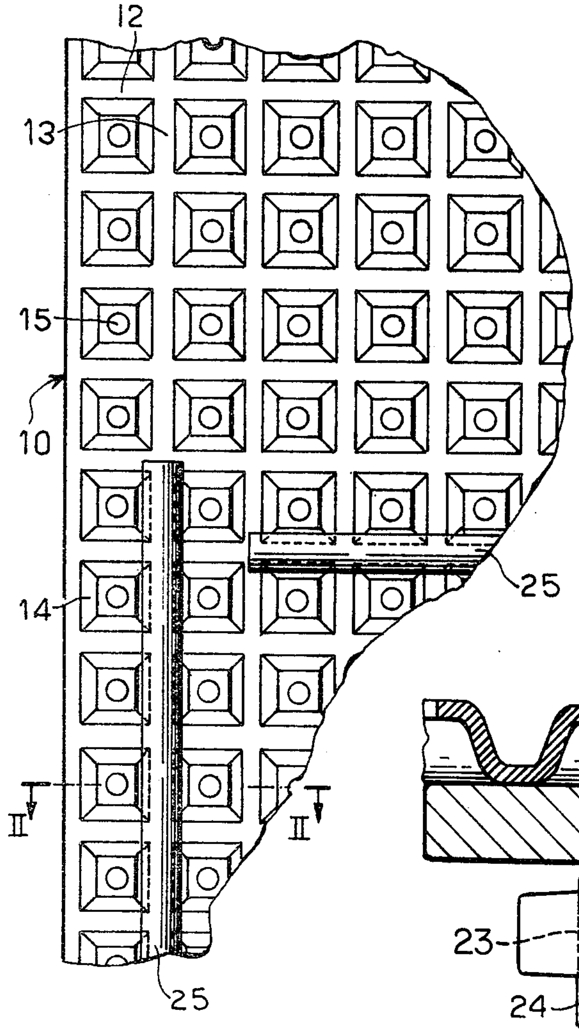
Fig.1
Fig.5
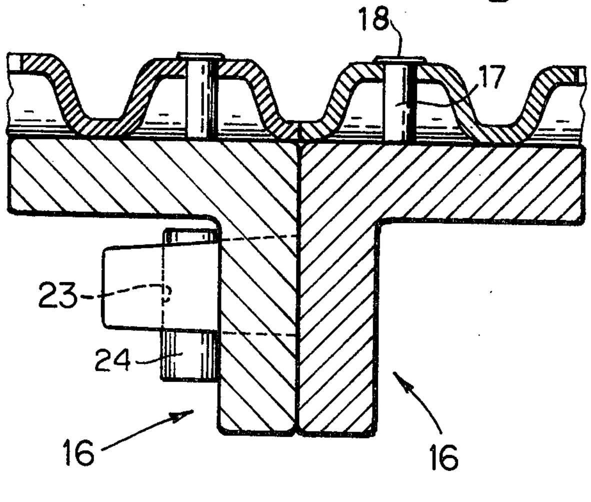

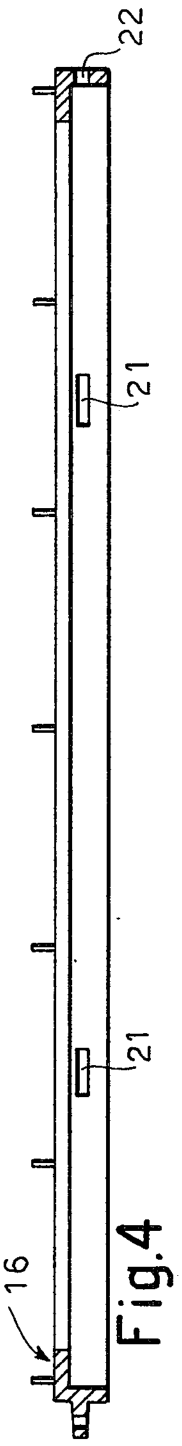
Fig.4
Fig.3
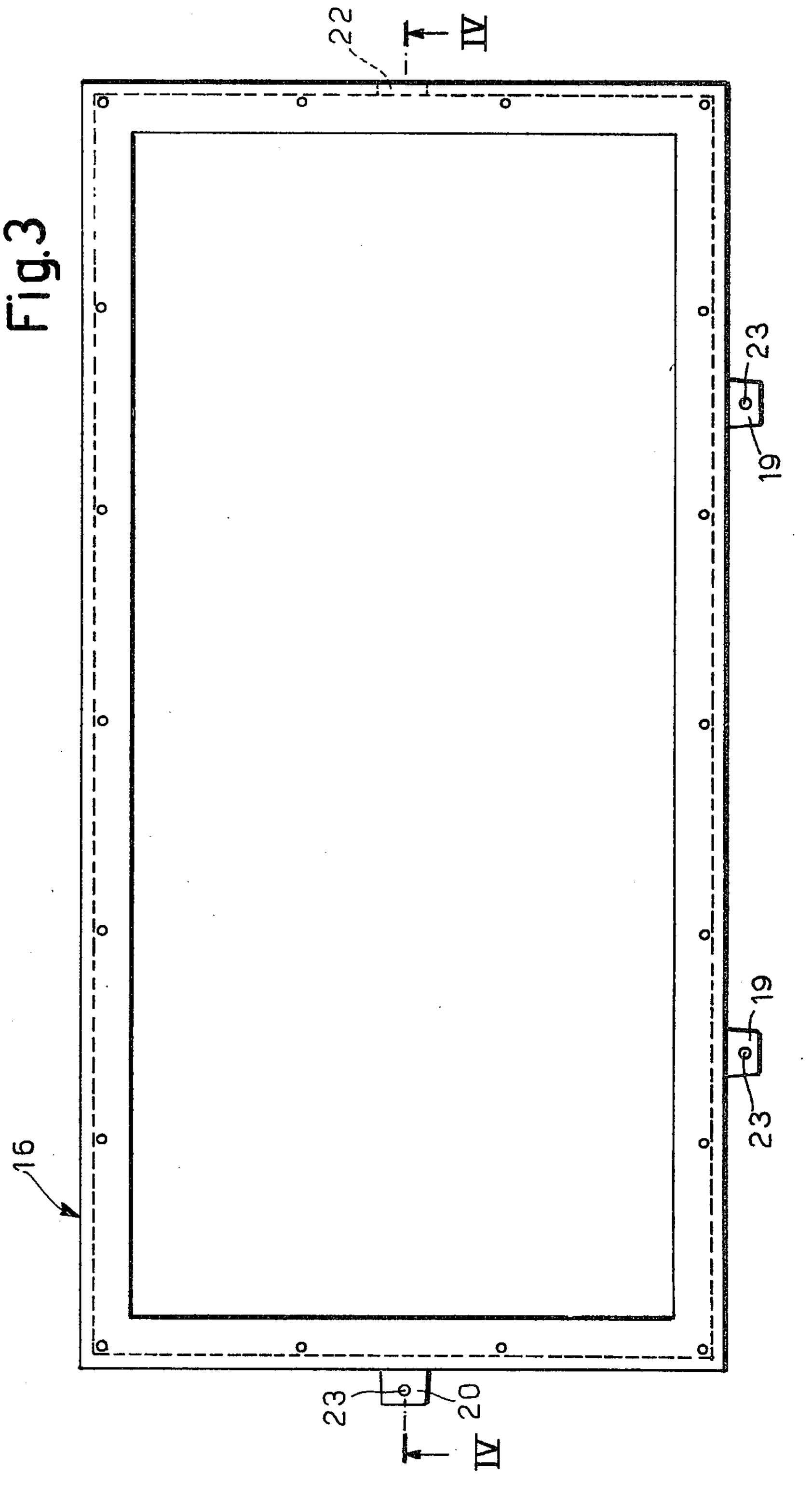

MODULAR PANEL THAT CAN BE ASSEMBLED WITH OTHER SIMILAR PANELS, WHEREBY TO FORM MAGNETIC BOARDS FOR PROGRAMMING AND STATISTICAL PURPOSES

BACKGROUND OF THE INVENTION

This invention relates to modular panels that can be assembled with other similar panels thus to form improved magnetic boards for programming and statistical purposes.

DESCRIPTION OF THE PRIOR ART

The heretofore known magnetic boards usually consist of a plurality of metal panels, removably connected with one another. Secured to each panel, usually by welding, are metal bars, parallel with, and spaced by a required amount from each other. By such bars, lying on the outer panel surface, an array of parallel grooves is formed, into which parts of magnetic signalling elements (or signalling indicators), can be engaged. Moreover, each bar subdivided into unit portions by colored marks, whereby a grating is formed which may be assimilated, in a sense, to a graph paper, and whereon the required data can be easily read, after having assigned given values to the vertical and horizontal lines. The shortcomings of magnetic boards of the above described type are: first of all, the arraying and welding of bars on each panel, and the subsequent subdivision of same bars into equal parts, result in a particularly expensive manufacturing of boards. Then, the orientation of boards can be either horizontal or vertical only, thus the panels are positioned with their bars either all horizontally or all vertically directed. Therefore, the need exists to dispose upon magnetic boards which prime cost be materially lower than that of boards heretofore known, and that could be indifferently utilized in both vertical and horizontal positions.

SUMMARY OF THE INVENTION

A general object of this invention is therefore to obviate the above-mentioned shortcomings, by providing an inexpensive magnetic board, that can be utilized in either a horizontal or a vertical position.

According to the invention, the object is attained by providing a magnetic board, made-up by panels consisting each of a metal sheet, wherein a grating defined by a first plurality of parallel grooves, and a second plurality of parallel grooves, the grooves of each plurality are equidistantly spaced and the grooves of one plurality are perpendicular to those of the other. The sheet is embossed, to form the grooves. The center-to-center distance of successive nodes or points of intersection subdivide the board into equal parts. Such structure allows one to obtain modular panels by a single embossing operation, with an obvious economic advantage.

Moreover, a structure is provided wherein the signalling elements can be both horizontally and vertically fitted on the board, whatever the orientation of the board may be.

In a preferred embodiment form of the invention, each panel is secured to a plastic frame by hot riveting, being each frame formed with groove-and-tongue joints, to allow for the mutual connection of modular panels.

BRIEF DESCRIPTION OF THE DRAWINGS

FIG. 1 is a plan view of a portion of a panel made according to the invention.

FIG. 2 is an enlarged section, taken on the line II—II of FIG. 1.

FIG. 3 is a plan view of a frame wherein the panel, as shown in the FIGS. 1 and 2, is fitted.

FIG. 4 is a section taken on the line IV—IV of FIG. 3;

FIG. 5 is an enlarged detail, showing how the modular panels are coupled with one another.

DESCRIPTION OF THE PREFERRED EMBODIMENT FORM

The structural and functional features of the invention, and the advantages thereof over the already known state of technique, will be better appreciated from a consideration of the following detailed description of an embodiment form of its object, taken with the accompanying drawings, being both description and drawings given as a non restrictive example only.

Referring now to drawings, the considered panel is indicated in its entirety by the numeral 10, and consists of a metal sheet 11 wherein a grating of grooves 12, 13 is embossed. The grooves 12 are parallel to each other, and are perpendicular to the grooves 13 which are parallel to each other. The grooves 12 and 13 are equidistantly spaced by a pre-established amount. The center-to-center distance of grating nodes, represents the unit subdivision into equal parts of board.

By the embossing of grooves 12, 13, generally truncated-pyramid shaped projections are formed, which top is bored, as shown by 15.

The embossed metal sheet 11 is then fastened within a rectangular plastics frame, denoted in its entirety by the numeral 16 (see FIGS. 3,4 and 5). Such fastening is performed by pins 17, extending from the frame 16, and hot-riveted, as in 18, in holes 15 of the sheet metal 11. The sides of the frame 16 are L-shaped, and are formed with rigid tabs 19, 20, extending outwardly from a major side and a minor side, respectively, as well as with corresponding openings 21, 22 in the remaining two sides; in addition, the tabs 19, 20 are drilled so as to be provided with holes 23.

In the assembling of a board, the tabs 19, 20 of a panel are inserted into the openings 21, 22 of an adjacent panel, and are locked therein by a pin 24, inserted into the corresponding hole 23 (see FIG. 5).

A signalling member 25 (see FIG. 1) is a type of magnetic signalling element which, thanks to the invention, may be placed either horizontally and vertically on the board, whatever the orientation thereof may be. Signalling elements of a different type could be fitted in the holes 15.

While the invention has been described in detail with respect to a now preferred embodiment form thereof, it is to be understood that various changes and modifications may be made therein. Thus, e.g., the frame wherein the metal sheet is fitted, and the connection means of frames, could be different, without departing from the spirit and scope of the invention, which are appropriately defined in the appended claims.

What I claim is:

1. A magnetic board, for holding signalling elements and the like contemporaneously horizontally and/or vertically, the board comprising a plurality of panels made up of respective metal sheets, each of said metal sheets having (1) a first plurality of spaced, parallel grooves embossed thereon for receiving signalling elements therein and (2) a second plurality of spaced, parallel grooves embossed thereon for receiving signalling elements therein, said grooves of said second plurality of grooves being perpendicular to those of said first plurality of grooves to form a grating subdividing said panels by grating nodes having equal center-to-center distances; and means for coupling adjacent ones of said panels to one another; whereby signalling elements may be contemporaneously placed in the grooves in horizontal and vertical positions, and wherein said means for coupling adjacent ones of said panels to one another comprise respective frames made of plastic material, holes being provided in said panels, and hot-riveted pins extending through said holes to secure ones of respective said panels to respective ones of said frames, said frames being formed with tongue-and-groove joints for coupling adjacent ones of said frames to one another.

* * * * *